(12) United States Patent
Uraoka

(10) Patent No.: US 10,960,863 B2
(45) Date of Patent: Mar. 30, 2021

(54) VEHICLE BRAKING CONTROL DEVICE

(71) Applicant: ADVICS CO., LTD., Kariya (JP)

(72) Inventor: Terushige Uraoka, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 16/484,533

(22) PCT Filed: Feb. 26, 2018

(86) PCT No.: PCT/JP2018/006841
§ 371 (c)(1),
(2) Date: Aug. 8, 2019

(87) PCT Pub. No.: WO2018/155663
PCT Pub. Date: Aug. 30, 2018

(65) Prior Publication Data
US 2020/0055502 A1 Feb. 20, 2020

(30) Foreign Application Priority Data

Feb. 27, 2017 (JP) .............................. JP2017-035009

(51) Int. Cl.
*B60T 8/34* (2006.01)
*B60T 8/32* (2006.01)
*B60T 8/86* (2006.01)

(52) U.S. Cl.
CPC .............. *B60T 8/34* (2013.01); *B60T 8/321* (2013.01); *B60T 8/86* (2013.01)

(58) Field of Classification Search
CPC ..... B60T 8/34; B60T 8/32; B60T 8/89; B60T 8/321; B60T 13/586; B60T 13/585; B60T 2270/60; B60T 7/12; B60T 13/686
See application file for complete search history.

(56) References Cited

U.S. PATENT DOCUMENTS 10,093,313 B2 * 10/2018 Araki ................... B60W 30/09
10,391,992 B2 * 8/2019 Kunz ................... B60T 13/741
(Continued)

FOREIGN PATENT DOCUMENTS

DE 102014215798 A1 * 2/2016 ............. F16D 65/18
JP 4840775 B2 12/2011

OTHER PUBLICATIONS

International Search Report (with English translation) and Written Opinion issued in corresponding International Patent Application No. PCT/JP2018/006841, 6 pages (dated Apr. 24, 2018).

*Primary Examiner* — Thomas W Irvin
(74) *Attorney, Agent, or Firm* — Buchanan Ingersoll & Rooney PC

(57) ABSTRACT

A vehicle braking control device is capable of further raising the speed at which vehicle vehicle-body deceleration increases when automatic braking processing implementation begins. Provided as a braking control device is a control device comprising: an acquisition unit that acquires an indicator; and a braking control unit that starts the implementation of automatic braking processing if a determination is made, on the basis of the indicator, that an automatic braking condition has been established. In the automatic braking process, the braking control unit restricts the supply of brake fluid to wheel cylinders corresponding to the rear wheels, and supplies brake fluid to wheel cylinders corresponding to the front wheels to increase the pressure of the wheel cylinders, thereby increasing the braking power for the front wheels and also giving the rear wheels braking power corresponding to the driving amount of a motor for parking.

3 Claims, 3 Drawing Sheets

(56) References Cited

U.S. PATENT DOCUMENTS

| | | | |
|---|---|---|---|
| 10,486,662 B2* | 11/2019 | Nakatsuka | B60R 21/34 |
| 10,632,981 B2* | 4/2020 | Lowe | G08G 1/166 |
| 2006/0267402 A1 | 11/2006 | Leiter et al. | |
| 2012/0319462 A1* | 12/2012 | Akita | B60T 13/165 |
| | | | 303/2 |
| 2017/0240156 A1* | 8/2017 | Kunz | B60T 7/12 |
| 2017/0253238 A1* | 9/2017 | Araki | B60T 13/686 |
| 2018/0072283 A1* | 3/2018 | Nakatsuka | B60R 21/00 |
| 2019/0176790 A1* | 6/2019 | Urano | B60T 8/00 |
| 2020/0017081 A1* | 1/2020 | Uraoka | B60T 7/12 |
| 2020/0047727 A1* | 2/2020 | Shimada | B60T 7/22 |
| 2020/0108805 A1* | 4/2020 | Woo | B60T 7/22 |

* cited by examiner

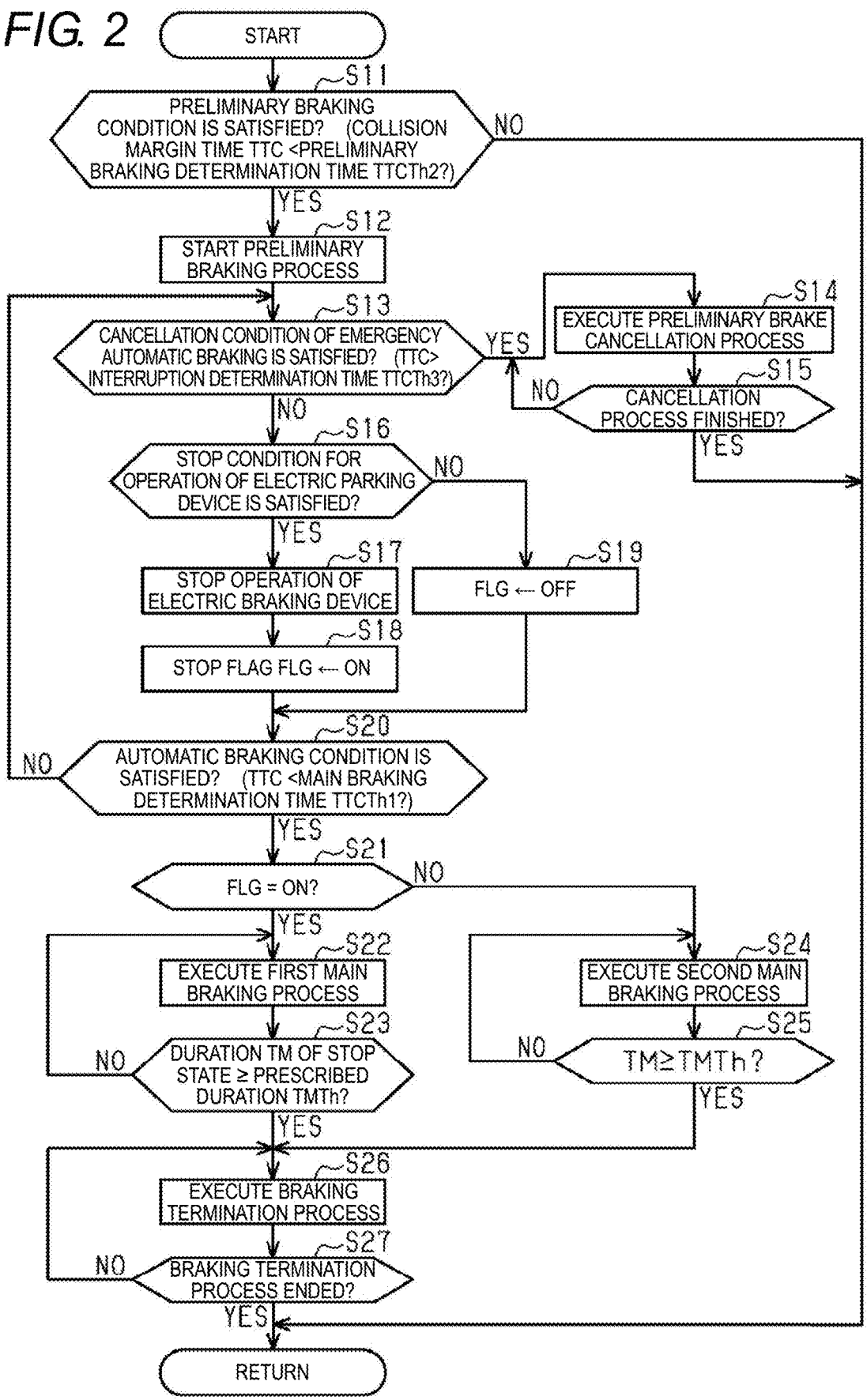

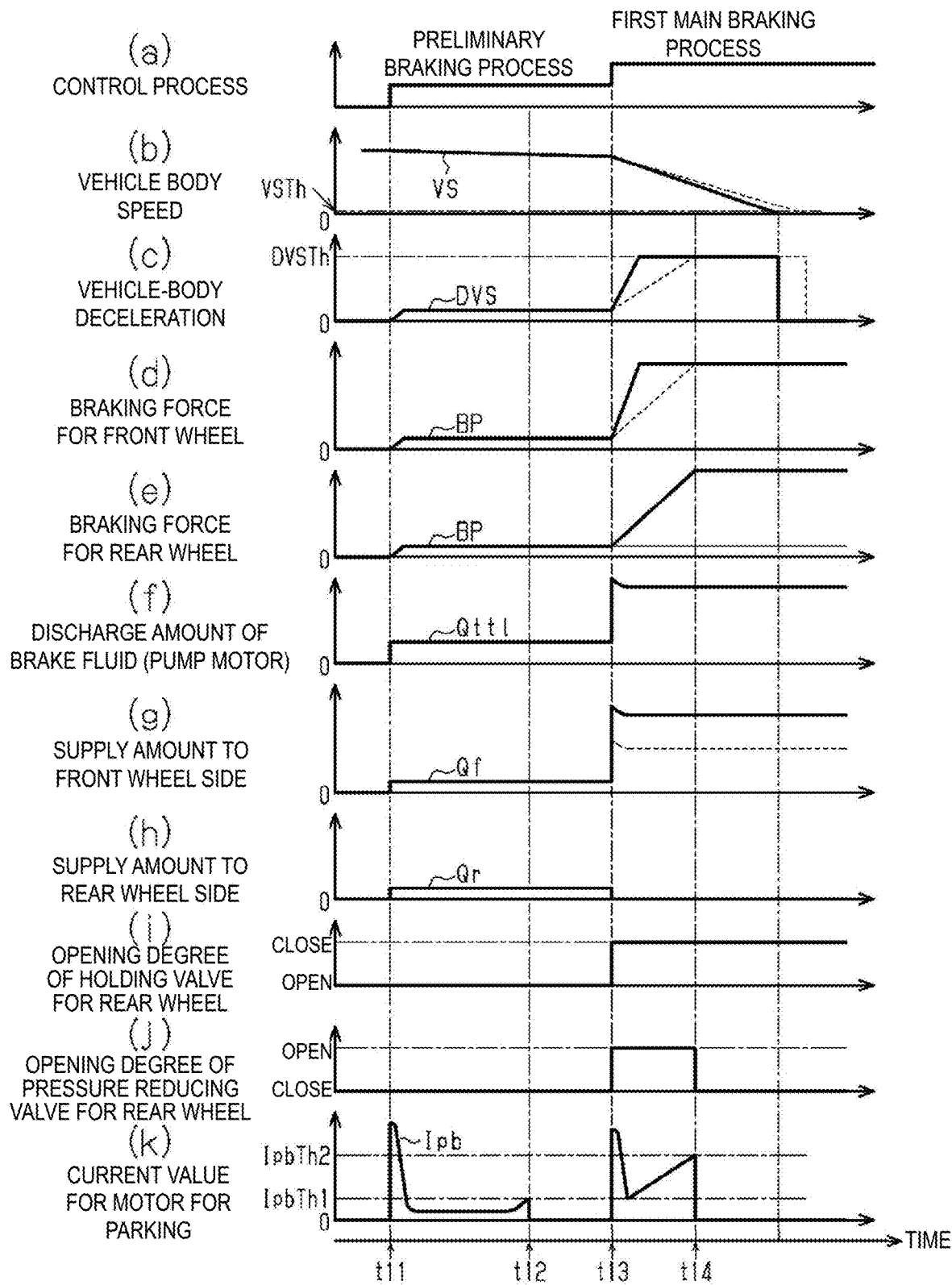

VEHICLE BRAKING CONTROL DEVICE

TECHNICAL FIELD

The present invention relates to a vehicle braking control device that performs an automatic braking process for decelerating the vehicle in order to suppress a collision between an obstacle ahead of the vehicle and the vehicle.

BACKGROUND ART

Patent Literature 1 describes an example of a braking system including a hydraulic pressure braking device that adjusts a braking force with respect to a wheel by controlling a hydraulic pressure in a wheel cylinder, and an electric braking device that uses the drive of an electric motor to apply a braking force corresponding to a driving amount of the electric motor to the wheel.

In such a braking system, when increasing the braking force on the wheels by the operation of the hydraulic pressure braking device, the brake fluid is discharged from a pump while adjusting the opening degree of a differential pressure adjustment valve disposed in a fluid path connecting the wheel cylinder and the master cylinder. Then, in a braking mechanism provided for the wheel, a piston displaces by the increase in hydraulic pressure in the wheel cylinder. A friction material is thereby pushed against such a piston, and the friction material approaches and makes contact with a rotary body integrally rotating with the wheel. When the hydraulic pressure is further increased, the force of pushing the friction material against the rotary body, that is, the braking force on the wheel increases.

In a case where the braking force is applied to the wheels by the operation of an electric braking device, the driving torque output from the electric motor is transmitted to a nut disposed in the wheel cylinder through a speed reduction mechanism. As the nut pushes the piston, the friction material is pushed by the nut through the piston, and the friction material approaches and makes contact with the rotary body. Then, when the driving of the electric motor is continued, the force of pushing the friction material against the rotary body, that is, the braking force on the wheel increases.

CITATIONS LIST

Patent Literature

Patent Literature 1: Japanese Patent Publication No. 4840775

SUMMARY OF INVENTION

Technical Problems

In an automatic braking process for suppressing a collision between an obstacle ahead of the vehicle and the vehicle, the vehicle is generally decelerated by increasing the hydraulic pressure of both the wheel cylinder corresponding to the front wheel and the wheel cylinder corresponding to the rear wheel by operation of the hydraulic pressure braking device. In this case, in order to further increase the increasing speed of a vehicle-body deceleration of the vehicle at the start of the execution of the automatic braking process, it is necessary to adopt a high performance part as a configuring part of the hydraulic pressure braking device, which leads to higher costs of the hydraulic pressure braking device.

Here, in a case where the automatic braking process is performed in a vehicle equipped with the braking system described above, it is conceivable to operate both the hydraulic pressure braking device and the electric braking device. In this case, the brake fluid is supplied by the pump to both the wheel cylinder corresponding to the front wheel and the wheel cylinder corresponding to the rear wheel by the operation of the hydraulic pressure braking device. Furthermore, in a rear wheel braking mechanism, the nut is displaced by the driving of the electric motor. Therefore, in the rear wheel braking mechanism, the piston is pushed by the hydraulic pressure or the nut in the wheel cylinder.

The displacement of the piston by the driving of the electric motor occurs after the nut comes into contact with the piston. However, the piston is displaced due to the increase in hydraulic pressure in the wheel cylinder while the nut comes into contact with the piston. Therefore, at the start of the execution of the automatic braking process, even if both the hydraulic pressure braking device and the electric braking device are operated, the displacement speed of the piston in the rear wheel braking mechanism is hardly changed from a case where the hydraulic pressure braking device is operated and the electric braking device is not operated. That is, the increasing speed of the braking force on the rear wheels does not become so high. Therefore, in the automatic braking process in which both the hydraulic pressure braking device and the electric braking device are operated, there is room for improvement in the increase in the increasing speed of the vehicle-body deceleration at the start of the execution.

Solutions to Problems

A vehicle braking control device for solving the problem described above is to be applied to a vehicle, the vehicle including: a plurality of braking mechanisms provided for each of the front and rear wheels of a vehicle; a hydraulic pressure braking device including a fluid supply source that supplies a brake fluid to a wheel cylinder of each of the braking mechanisms, and configured to individually adjust a hydraulic pressure in each wheel cylinder; and an electric braking device that applies a braking force corresponding to a driving amount of an electric motor to one of a front wheel and a rear wheel. The vehicle braking control device includes an acquisition unit that acquires an indicator representing a degree of a possibility that the vehicle collides with an obstacle ahead of the vehicle; and a braking control unit that starts execution of an automatic braking process of increasing a braking force on both the front wheel and the rear wheel and decelerating the vehicle when determined that an automatic braking condition is satisfied based on the acquired indicator. In the automatic braking process, the braking control unit restricts supply of a brake fluid to the wheel cylinder corresponding to one wheel and supplies a brake fluid to the wheel cylinder corresponding to the other of the front wheel and the rear wheel to increase a hydraulic pressure in the wheel cylinder to cause the hydraulic pressure braking device to increase a braking force on the other wheel and cause the electric braking device to increase a braking force on the one wheel by driving of the electric motor.

According to the configuration described above, when the automatic braking process is performed because the automatic braking condition is satisfied, the braking force corresponding to the driving amount of the electric motor is applied to the one wheel by the operation of the electric braking device. Furthermore, in the automatic braking process, the brake fluid is supplied from the fluid supply source into the wheel cylinder corresponding to the other wheel and the supply of the brake fluid to the wheel cylinder corresponding to the one wheel is restricted among the wheel cylinder for the front wheel and the wheel cylinder for the rear wheel by the operation of the hydraulic pressure braking device. Therefore, compared with a case where the supply of the brake fluid to the wheel cylinder corresponding to the one wheel is not restricted, the amount of the brake fluid flowing toward the wheel cylinder corresponding to the other wheel is increased. As a result, the increasing speed of the hydraulic pressure in the wheel cylinder corresponding to the one wheel, that is, the increasing speed of the braking force with respect to the one wheel can be increased. Therefore, the vehicle-body deceleration of the vehicle at the start of the execution of the automatic braking process can be further increased.

BRIEF DESCRIPTION OF DRAWINGS

FIG. 2 is a flowchart describing a processing routine executed by a braking control unit of the control device.

FIGS. 3(a) to 3(k) are timing charts at the time of performing an emergency automatic braking.

DESCRIPTION OF EMBODIMENT

Figure 1:
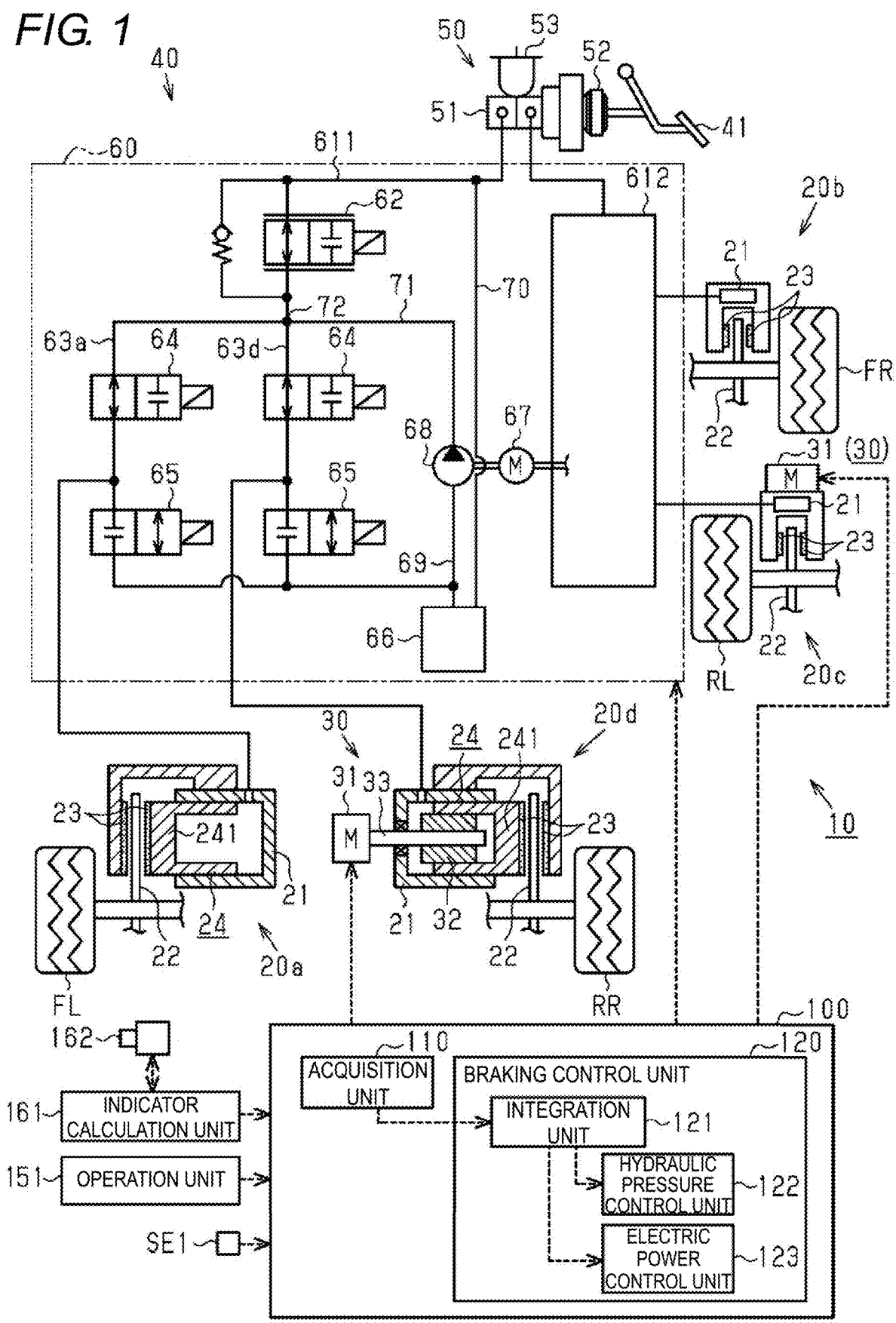
FIG. 1 is a schematic configuration diagram showing a control device which is an embodiment of a vehicle braking control device and a braking system controlled by the control device.

Hereinafter, one embodiment of a vehicle braking control device will be described with reference to FIGS. 1 to 3. FIG. 1 illustrates a functional configuration of a control device 100 which is a braking control device of the present embodiment and a schematic configuration of a braking system 10 controlled by the control device 100. The braking system 10 includes a plurality of braking mechanisms 20a, 20b, 20c, and 20d (i.e., the same number as the wheels) individually provided with respect to each of the wheels FL, FR, RL, and RR, an electric parking device 30 serving as an example of an electric braking device, and a hydraulic pressure braking device 40.

Each of the braking mechanisms 20a to 20d includes a wheel cylinder 21 to which the brake fluid is supplied, a disk rotor 22 serving as an example of a rotary body that integrally rotates with the wheels FL, FR, RL, and RR, and a friction material 23 that relatively moves in a direction of approaching to and a direction of separating from the disk rotor 22. A piston 24 of the wheel cylinder 21 has a bottomed substantially tubular shape, and a bottom wall 241 of the piston 24 supports the friction material 23. When the WC pressure Pwc, which is the hydraulic pressure in the wheel cylinder 21, is increased by the supply of the brake fluid to the wheel cylinder 21, the piston 24 of the wheel cylinder 21 approaches the disk rotor 22 and the friction material 23 relatively approaches the disk rotor 22. Then, when the friction material 23 comes into contact with the disk rotor 22, the braking force corresponding to the force of pushing the friction material 23 against the disk rotor 22 is applied to the wheels FL, FR, RL, and RR. In this case, the force of pushing the friction material 23 against the disk rotor 22 increases as the WC pressure Pwc increases. That is, the braking forces on the wheels FL, FR, RL, and RR increase as the WC pressure Pwc in the corresponding wheel cylinder 21 increases.

In the present description, among the braking mechanisms 20a to 20d, the braking mechanism provided for the left front wheel FL is referred to as the front wheel braking mechanism 20a, and the braking mechanism provided for the right front wheel FR is referred to as the front wheel braking mechanism 20b. Furthermore, the braking mechanism provided for the left rear wheel RL is referred to as the rear wheel braking mechanism 20c, and the braking mechanism provided for the right rear wheel RR is referred to as the rear wheel braking mechanism 20d.

The electric parking device 30 is provided for each of the rear wheels RL and RR. Each electric parking device 30 includes a motor 31 for parking, which is an example of an electric motor attached to the rear wheel braking mechanisms 20c and 20d, a nut 32, which is an example of a pushing member disposed in the wheel cylinder 21 of the rear wheel braking mechanisms 20c and 20d, and a shaft member 33, which is rotated by the driving of the motor 31 for parking. When the braking force is not applied to the rear wheels RL and RR by the operation of the electric parking device 30, a gap larger than or equal to a regular interval is formed between the bottom wall 241 of the piston 24 and the nut 32. That is, the nut 32 is not in contact with the bottom wall 241 of the piston 24.

The shaft member 33 is externally threaded, and the nut 32 is screwed into the shaft member 33. Therefore, when the shaft member 33 is rotated by the driving of the motor 31 for parking, the nut 32 is displaced in the extending direction of the shaft member 33. Specifically, when the shaft member 33 is rotating in the forward rotating direction, the nut 32 is displaced in the direction of approaching a disk rotor 22, whereas when the shaft member 33 is rotating in the reverse direction to the forward rotating direction, the nut 32 is displaced in the direction of separating from the disk rotor 22. When the nut 32 displaced in the direction of approaching the disk rotor 22 by the driving of the motor 31 for parking comes into contact with the bottom wall 241 of the piston 24, the piston 24 approaches the disk rotor 22 in a form of being pushed by the nut 32. Thus, the friction material 23 relatively approaches the disk rotor 22. Then, when the friction material 23 comes into contact with the disk rotor 22, the braking force corresponding to the force of pushing the friction material 23 against the disk rotor 22 is applied to the rear wheels RL and RR. In this case, the force of pushing the friction material 23 against the disk rotor 22 becomes larger as the driving amount of the motor 31 for parking becomes larger. That is, the braking force on the rear wheels RL and RR increases as the driving amount of the motor 31 for parking increases.

In the present embodiment, the rear wheels RL and RR correspond to "one wheel" capable of applying a braking force corresponding to the driving amount of the motor 31 for parking, and the front wheels FL and FR correspond to the "other wheel".

Next, the hydraulic pressure braking device 40 will be described with reference to FIG. 1.

As shown in FIG. 1, the hydraulic pressure braking device 40 includes a hydraulic pressure generation device 50 to which a braking operation member 41 such as a brake pedal operated by the driver is connected, and a braking actuator 60 capable of individually adjusting the WC pressure Pwc in each wheel cylinder 21. The operation of the braking operation member 41 by the driver may be referred to as "braking operation", and the force by which the driver operates the braking operation member 41 may be referred to as "braking operation force".

The hydraulic pressure generation device 50 includes a master cylinder 51, a booster 52 that assists the braking operation force input to the braking operation member 41, and a reservoir tank 53 in which the brake fluid is stored. In the master cylinder 51, when the braking operation force assisted by the booster 52 is input, an MC pressure Pmc which is a hydraulic pressure corresponding to the braking operation force is generated.

The braking actuator 60 includes two systems of hydraulic pressure circuits 611 and 612. The wheel cylinder 21 corresponding to the left front wheel FL and the wheel cylinder 21 corresponding to the right rear wheel RR are connected to the first hydraulic pressure circuit 611. Furthermore, the wheel cylinder 21 corresponding to the right front wheel FR and the wheel cylinder 21 corresponding to the left rear wheel RL are connected to the second hydraulic pressure circuit 612. When the brake fluid flows into the first and second hydraulic pressure circuits 611 and 612 from the hydraulic pressure generation device 50c, the brake fluid is supplied to the wheel cylinder 21.

A differential pressure adjustment valve 62 which is a linear electromagnetic valve is provided on a fluid path connecting the master cylinder 51 and the wheel cylinder 21 in the hydraulic pressure circuit 611. Furthermore, a path 63a for the left front wheel and a path 63d for the right rear wheel are provided on the wheel cylinder 21 side of the differential pressure adjustment valve 62 in the first hydraulic pressure circuit 611. The paths 63a and 63d are provided with a holding valve 64 closed when regulating the increase of the WC pressure Pwc, and a pressure reducing valve 65 opened when decreasing the WC pressure Pwc. The holding valve 64 is a normally open electromagnetic valve, and the pressure reducing valve 65 is a normally closed electromagnetic valve.

A reservoir 66 for temporarily storing the brake fluid that has flowed out from the wheel cylinder 21 through the pressure reducing valve 65, and a pump 68 that is operated based on the driving of the pump motor 67 are connected to the first hydraulic pressure circuit 611. The reservoir 66 is connected to the pump 68 through a suction flow path 69, and is connected to a fluid path on the master cylinder 51 side of the differential pressure adjustment valve 62 through the master side flow path 70. The pump 68 is connected to a connecting portion 72 between the differential pressure adjustment valve 62 and the holding valve 64 through a supply flow path 71. Thus, when the pump motor 67 is driven, the pump 68 draws the brake fluid in the master cylinder 51 through the reservoir 66 and discharges the brake fluid to the connecting portion 72. The pump 68 is an example of a "fluid supply source".

Since the structure of the second hydraulic pressure circuit 612 is substantially the same as the structure of the first hydraulic pressure circuit 611, the description of the structure of the second hydraulic pressure circuit 612 will be omitted in the present description.

Next, the control device 100 will be described with reference to FIG. 1.

As shown in FIG. 1, the control device 100 is electrically connected to an operation unit 151 and an indicator calculation unit 161. The operation unit 151 is operated by a passenger of the vehicle when operating the electric parking device 30.

A detection system 162 for detecting an obstacle ahead of the vehicle is electrically connected to the indicator calculation unit 161. The indicator calculation unit 161 calculates a collision margin time TTC, which is an example of an indicator indicating the degree of possibility that the vehicle will collide with an obstacle ahead of the vehicle, based on the detection result of the detection system 162, and transmits the collision margin time TTC to the control device 100. The collision margin time TTC is calculated so as to be shorter as the possibility of the vehicle colliding with the obstacle becomes higher. For example, the collision margin time TTC can be derived by dividing the distance between the obstacle and the vehicle by the relative speed of the vehicle with respect to the obstacle. When the detection system 162 cannot detect an obstacle ahead of the vehicle, the indicator calculation unit 161 transmits such information to the control device 100.

Furthermore, various sensors such as a vehicle speed sensor SE1 for detecting a vehicle body speed VS of the vehicle are electrically connected to the control device 100.

The control device 100 includes an acquisition unit 110 and a braking control unit 120 as functional units for performing emergency automatic braking that decelerates the vehicle in order to suppress a collision between an obstacle and the vehicle.

The acquisition unit 110 acquires the collision margin time TTC transmitted from the indicator calculation unit 161 for each predetermined control cycle, and outputs the acquired collision margin time TTC to the braking control unit 120.

The braking control unit 120 includes an integration unit 121, a hydraulic pressure control unit 122, and an electric power control unit 123. The integration unit 121 determines, for example, whether or not the preliminary braking process to be described later is performed, whether or not the first main braking process is performed, and whether or not the second main braking process is performed. The hydraulic pressure control unit 122 controls the operation of the braking actuator 60 of the hydraulic pressure braking device 40 based on the instruction from the integration unit 121. The electric power control unit 123 controls the operation of each electric parking device 30 based on an instruction from the integration unit 121.

Next, a processing routine executed by the braking control unit 120 to perform the emergency automatic braking will be described with reference to FIGS. 2 and 3. This processing routine is executed each time the time corresponding to the control cycle has elapsed since the last execution of the processing routine.

As shown in FIG. 2, in the present processing routine, in the first step S11, determination on whether or not the preliminary braking condition is satisfied is made by the integration unit 121 based on the collision margin time TTC. The preliminary braking condition is a condition under which it is possible to determine that there is a possibility of a collision although the possibility of the vehicle colliding with an obstacle is lower than when the automatic braking condition described later is satisfied. Specifically, when the collision margin time TTC is less than the preliminary braking determination time TTCTh2, the integration unit 121 determines that the preliminary braking condition is satisfied, and when the collision margin time TTC is longer than or equal to the preliminary braking determination time TTCTh2, the integration unit 121 does not determine that the preliminary braking condition is satisfied.

Then, when not determined that the preliminary braking condition is satisfied (step S11: NO), this processing routine is temporarily ended. On the other hand, when determined that the preliminary braking condition is satisfied (step S11: YES), the process proceeds to the next step S12. Then, in step S12, the execution of the preliminary braking process is started. Specifically, the integration unit 121 instructs both the hydraulic pressure control unit 122 and the electric power control unit 123 to perform the preliminary braking process. Then, the hydraulic pressure control unit 122 starts driving the pump motor 67 so that the pump 68 discharges the brake fluid. In this case, the hydraulic pressure control unit 122 controls the pump motor 67 so as to be driven at a lower speed than when performing the first main braking process and the second main braking process described later. Furthermore, the electric power control unit 123 drives the motor 31 for parking until the interval between the bottom wall 241 of the piston 24 and the nut 32 in the wheel cylinders 21 of each of the rear wheel braking mechanisms 20c and 20d becomes smaller than or equal to the prescribed interval. In the present embodiment, the prescribed interval is a value equal to "0", and the motor 31 for parking is driven until the nut 32 contacts the bottom wall 241.

Here, control of the electric parking device 30 in the preliminary braking process will be described with reference to FIG. 3. As shown in FIG. 3(k), when the execution of the preliminary braking process is started at the first timing t11, the driving of the motor 31 for parking is started. Then, the current value Ipb with respect to the motor 31 for parking is rapidly increased. That is, inrush current flows to the motor 31 for parking. As described above, since the nut 32 is separated from the bottom wall 241 of the piston 24 at the initial stage of driving the motor 31 for parking, the load on the motor 31 for parking is small. Therefore, after the inrush current flows to the motor 31 for parking, the current value Ipb is maintained at a small value. When the nut 32 starts to come into contact with the bottom wall 241, the load on the motor 31 for parking gradually increases, and the current value Ipb starts to increase. Then, when the current value Ipb reaches a contact determination current value IpbTh1 at the second timing t12, determination can be made that the nut 32 is in contact with the bottom wall 241, and thus the driving of the motor 31 for parking is stopped.

Returning to FIG. 2, when the execution of the preliminary braking process is started, the process proceeds to the next step S13. Then, in step S13, determination on whether or not a cancellation condition of the emergency automatic braking is satisfied is made by the integration unit 121. The cancellation condition of the emergency automatic braking is a condition under which determination can be made that the possibility of the vehicle colliding with the obstacle has become extremely low. Specifically, the integration unit 121 determines whether or not the collision margin time TTC is longer than an interruption determination time TTCTh3. The interruption determination time TTCTh3 is set to a time longer than the preliminary braking determination time TTCTh2. Then, the integration unit 121 determines that the cancellation condition of the emergency automatic braking is satisfied when the collision margin time TTC is longer than the interruption determination time TTCTh3, but does not determine that the cancellation condition is satisfied when the collision margin time TTC is less than or equal to the interruption determination time TTCTh3.

When determined in step S13 that the cancellation condition of the emergency automatic braking is satisfied (YES), the process proceeds to the next step S14. Then, in step S14, the cancellation process of the preliminary braking is performed. That is, the integration unit 121 instructs both the hydraulic pressure control unit 122 and the electric parking device 30 to perform the cancellation process of the preliminary braking. Then, the hydraulic pressure control unit 122 stops the operation of the braking actuator 60, that is, the driving of the pump motor 67. Furthermore, the electric power control unit 123 controls the driving of the motor 31 for parking so that a gap larger than or equal to a regular interval is provided between the bottom wall 241 of the piston 24 and the nut 32.

Subsequently, in the next step S15, determination on whether or not the execution of the cancellation process of the preliminary braking has ended is made by the integration unit 121. That is, when the interval between the nut 32 and the bottom wall 241 becomes larger than or equal to a regular interval and the driving of the motor 31 for parking is stopped, the electric power control unit 123 outputs a notification that the driving of the motor 31 for parking is stopped to the integration unit 121. Therefore, when the notification that the driving of the motor 31 for parking is stopped is input from the electric power control unit 123, the integration unit 121 determines that the execution of the cancellation process has ended. Then, when the execution of the cancellation process is not completed (step S15: NO), the process proceeds to the above-described step S14, that is, the execution of the cancellation process is continued. On the other hand, when the execution of the cancellation process has ended (step S15: YES), the present processing routine is once temporarily ended.

On the other hand, when not determined in step S13 that the cancellation condition of the emergency automatic braking is satisfied (NO), the process proceeds to the next step S16. Then, in step S16, the electric power control unit 123 determines whether or not the stop condition for the operation of the electric parking device 30 is satisfied during the execution of the preliminary braking process. The electric power control unit 123 determines that the stop condition is satisfied when the current value Ipb with respect to the motor 31 for parking has reached the contact determination current value IpbTh1, and does not determine that the stop condition is satisfied when the current value Ipb has not reached the contact determination current value IpbTh1.

Therefore, when determined that the stop condition is satisfied (step S16: YES), the process proceeds to the next step S17. Then, in step S17, the operation of the electric parking device 30, that is, the driving of the motor 31 for parking is stopped by the electric power control unit 123. Subsequently, in the next step S18, the integration unit 121 sets the stop flag FLG to ON. Thereafter, the process proceeds to step S20 to be described later.

On the other hand, when not determined in step S16 that the stop condition is satisfied (NO), the process proceeds to the next step S19. Then, in step S19, the integration unit 121 sets the stop flag FLG to OFF. In this case, the driving of the motor 31 for parking is continued. Thereafter, the process proceeds to the next step S20.

In step S20, the integration unit 121 determines whether or not the automatic braking condition is satisfied based on the collision margin time TTC. The automatic braking condition is a condition with which determination can be made that the possibility of the vehicle colliding with the obstacle is high at the current relative speed. Specifically, the integration unit 121 determines that the automatic braking condition is satisfied when the collision margin time TTC is shorter than the main braking determination time TTCTh1, and does not determine that the automatic braking condition is satisfied when the collision margin time TTC is longer than or equal to the main braking determination time TTCTh1. The main braking determination time TTCTh1 is set to a time shorter than the preliminary braking determination time TTCTh2.

When not determined that the automatic braking condition is satisfied (step S20: NO), the process proceeds to step S13 described above. On the other hand, when determined that the automatic braking condition is satisfied (step S20: YES), the process proceeds to the next step S21. Then, in step S21, the integration unit 121 determines whether or not the stop flag FLG is set to ON. The stop flag FLG is a flag which is set to ON when the driving of the motor 31 for parking is stopped, and is set to OFF when the motor 31 for parking is still driven. When the stop flag FLG is set to ON (step S21: YES), the process proceeds to the next step S22.

In step S22, the first main braking process is performed. Specifically, the integration unit 121 instructs the hydraulic pressure control unit 122 and the electric power control unit 123 to perform the first main braking process. Then, the electric power control unit 123 drives the each of the motors 31 for parking to increase the braking forces on the rear wheels RL and RR. Furthermore, the hydraulic pressure control unit 122 operates the braking actuator 60 to increase the WC pressure Pwc in the wheel cylinders 21 of the front wheel braking mechanisms 20a and 20b without increasing the WC pressure Pwc in the wheel cylinders 21 of the rear wheel braking mechanisms 20c and 20d, thus increasing the braking forces BP on the front wheels FL and FR.

Here, the operation of the electric parking device 30 in the first main braking process will be described with reference to FIG. 3. As shown in FIG. 3(k), when the execution of the first main braking process is started at the third timing t13, the driving of the motor 31 for parking is started. Then, the current value Ipb with respect to the motor 31 for parking is rapidly increased. That is, inrush current flows to the motor 31 for parking. The nut 32 is in contact with the bottom wall 241 of the piston 24 in the wheel cylinders 21 of the rear wheel braking mechanisms 20c and 20d by the execution of the preliminary braking process. Therefore, after the rush current flows to the motor 31 for parking, the load on the motor 31 for parking increases due to the increase in the force of pressing the friction material 23 against the disk rotor 22, and thus the current value Ipb increases. Then, when the current value Ipb reaches the target determination current value IpbTh2 at the fourth timing t14, determination can be made that the braking force on the rear wheels RL and RR has become sufficiently large so that the driving of the motor 31 for parking is stopped. The target determination current value IpbTh2 is set to a value larger than the contact determination current value IpbTh1.

The operation of the braking actuator 60 of the hydraulic pressure braking device 40 in the first main braking process will be described with reference to FIG. 3. That is, as shown in FIG. 3(f), as the pump motor 67 is driven at a higher speed than when the preliminary braking process is performed, the discharge amount Qttl of the brake fluid from the pump 68 becomes larger than before the start of execution of the first main braking process. Furthermore, in the braking actuator 60, the opening degree of the differential pressure adjustment valve 62 narrows, and the holding valve 64 corresponding to the rear wheels RL and RR is closed as shown in FIG. 3(i). Furthermore, as shown in FIG. 3(j), during the period in which the motor 31 for parking is being driven, such as from the third timing t13 to the fourth timing t14, the pressure reducing valve 65 corresponding to the rear wheels RL and RR is opened.

Returning to FIG. 2, when the execution of the first main braking process is started, the process proceeds to the next step S23. Then, in step S23, the integration unit 121 determines whether or not the vehicle is in a stopped state, that is, whether or not the duration TM of the vehicle stop state is longer than or equal to a prescribed duration TMTh. That is, the integration unit 121 determines that the vehicle is stopped when the vehicle body speed VS of the vehicle becomes lower than or equal to a stop determination speed VSTh. Then, the integration unit 121 measures the duration of the state where the vehicle body speed VS is lower than or equal to the stop determination speed VSTh as the duration TM of the stop state. Therefore, when the vehicle is not yet stopped, that is, when the vehicle body speed VS is higher than the stop determination speed VSTh, the duration TM is equal to "0".

When the duration TM is less than the prescribed duration TMTh (step S23: NO), the process proceeds to step S22 described above, that is, the execution of the first main braking process is continued. On the other hand, when the duration TM is longer than or equal to the prescribed duration TMTh (step S23: YES), the process proceeds to step S26 to be described later.

When the stop flag FLG is set to OFF (NO) in step S21, on the other hand, the process proceeds to the next step S24. Then, in step S24, a second main braking process is performed. Specifically, the integration unit 121 instructs the hydraulic pressure control unit 122 and the electric power control unit 123 to perform the second main braking process. Then, the electric power control unit 123 stops the driving of each motor 31 for parking. Furthermore, the hydraulic pressure control unit 122 operates the braking actuator 60 to increase the WC pressure Pwc in the wheel cylinder 21 of each of the rear wheel braking mechanisms 20c and 20d and the WC pressure Pwc in the wheel cylinder 21 of each of the front wheel braking mechanism 20a and 20b, thus increasing the braking force BP with respect to each of the wheels FL, FR, RL, and RR.

Here, the operation of the braking actuator 60 of the hydraulic pressure braking device 40 in the second main braking process will be described. That is, as the pump motor 67 is driven at a higher speed than when the preliminary braking process is performed, the discharge amount Qttl of the brake fluid from the pump 68 is larger than before the start of the second main braking process. Furthermore, in the braking actuator 60, the opening degree of the differential pressure adjustment valve 62 becomes narrow. Therefore, the amount of brake fluid flowing into each wheel cylinder 21 increases, and the WC pressure Pwc in each wheel cylinder 21 increases. As a result, the braking force on each of the wheels FL, FR, RL, and RR increases.

When the execution of the second main braking process is started, the process proceeds to the next step S25. Then, similarly to the process in step S23, in step S25, the integration unit 121 determines whether or not the duration TM of the stop state is longer than or equal to the prescribed duration TMTh. When the duration TM is less than the prescribed duration TMTh (step S25: NO), the process proceeds to step S24 described above, that is, the execution of the second main braking process is continued. On the other hand, when the duration TM is longer than or equal to the prescribed duration TMTh (step S25: YES), the process proceeds to the next step S26.

In step S26, a braking termination process is performed. Specifically, the integration unit 121 instructs both the hydraulic pressure control unit 122 and the electric power control unit 123 to perform the braking termination process. Then, the hydraulic pressure control unit 122 stops the operation of the braking actuator 60. Furthermore, the electric power control unit 123 controls the driving of the motor 31 for parking so that a gap larger than or equal to a regular interval is provided between the bottom wall 241 of the piston 24 and the nut 32.

Then, in the next step S27, the integration unit 121 determines whether or not the execution of the braking termination process has ended. That is, when the interval between the nut 32 and the bottom wall 241 becomes larger than or equal to a regular interval and the driving of the motor 31 for parking is stopped, the electric power control unit 123 outputs a notification that the driving of the motor 31 for parking is stopped to the integration unit 121. Therefore, when the notification that the driving of the motor 31 for parking is stopped is input from the electric power control unit 123, the integration unit 121 determines that the execution of the braking termination process has ended. When the execution of the braking termination process has not ended (step S27: NO), the process proceeds to step S26 described above, that is, the execution of the braking termination process is continued. On the other hand, when the execution of the braking termination process has ended (step S27: YES), the present processing routine is temporarily ended.

Next, the operations in performing the emergency automatic braking will be described together with the effects with reference to FIG. 3.

As shown in FIGS. 3(*a*) to 3(*k*), when the collision margin time TTC becomes shorter than the preliminary braking determination time TTCTh2 at the first timing t11 during traveling of the vehicle, and the preliminary braking condition is satisfied, the execution of the preliminary braking process is started. That is, as shown in FIG. 3(*f*), in the braking actuator 60, the driving of the pump motor 67 is started, and the brake fluid is discharged from the pump 68. In this case, since the holding valve 64 corresponding to the front wheels FL and FR and the holding valve 64 corresponding to the rear wheels RL and RR are not closed, the brake fluid discharged from the pump 68 is supplied to the wheel cylinder 21 corresponding to the front wheels FL and FR and the wheel cylinder 21 corresponding to the rear wheels RL and RR, as shown in FIGS. 3(*g*) and 3(*h*). Then, in each of the braking mechanisms 20*a* to 20*d*, the WC pressure Pwc in the wheel cylinder 21 is slightly increased, and the friction material 23 approaches and contacts the disk rotor 22. Therefore, as shown in FIGS. 3(*c*), 3(*d*), and 3(*e*), the braking force BP is applied to each of the wheels FL, FR, RL, and RR, and as a result, the vehicle-body deceleration DVS of the vehicle becomes larger than before the first timing t11.

Furthermore, during the execution of the preliminary braking process, in the electric parking device 30, the motor 31 for parking is driven as shown in FIG. 3(*k*).

That is, the nut 32 approaches the bottom wall 241 of the piston 24 in the wheel cylinder 21 of each of the rear wheel braking mechanisms 20*c* and 20*d* by driving the motor 31 for parking. When the nut 32 comes into contact with the bottom wall 241, the current value Ipb with respect to the motor 31 for parking starts to increase. When the current value Ipb reaches the contact determination current value IpbTh1 at the second timing t12, determination can be made that the nut 32 is in contact with the bottom wall 241, and thus the driving of the motor 31 for parking is stopped to maintain the relevant state.

When the collision margin time TTC becomes shorter than the main braking determination time TTCTh1 at the third timing t13 after the second timing t12, the automatic braking condition is satisfied. In the example shown in FIG. 3, at the third timing t13, the state in which the nut 32 is in contact with the bottom wall 241 of the piston 24 is already held in the wheel cylinder 21 of each of the rear wheel braking mechanisms 20*c* and 20*d*. Therefore, the execution of the first main braking process is started.

Specifically, in the electric parking device 30, the driving of the motor 31 for parking is resumed. At the third timing t13, the nut 32 is in contact with the bottom wall 241, and the friction material 23 is in contact with the disk rotor 22. Therefore, in the rear wheel braking mechanisms 20*c* and 20*d*, the force of pressing the friction material 23 against the disk rotor 22 increases with the start of the displacement of the nut 32 accompanying the driving of the motor 31 for parking. That is, as shown in FIG. 3(*e*), the increase in the braking force BP with respect to the rear wheels RL and RR can be started early.

As shown in FIGS. 3(*e*) and 3(*k*), the current value Ipb with respect to the motor 31 for parking increases as the braking force BP with respect to the rear wheels RL and RR increases. Then, when the current value Ipb reaches the target determination current value IpbTh2 at the fourth timing t14, the driving of the motor 31 for parking is stopped. Therefore, at and after the fourth timing t14, the braking force BP with respect to the rear wheels RL and RR is held.

Furthermore, during the execution of the first main braking process, the braking actuator 60 is operated as shown in FIGS. 3(*f*) to 3(*j*) in the hydraulic pressure braking device 40. That is, the driving speed of the pump motor 67 is increased, the discharge amount Qttl of the brake fluid from the pump 68 is increased, and the opening degree of the differential pressure adjustment valve 62 is narrowed. In addition, the holding valve 64 corresponding to the rear wheels RL and RR is closed. Therefore, the supply amount Qr of the brake fluid into the wheel cylinder 21 corresponding to the rear wheels RL and RR becomes equal to "0". On the other hand, since the holding valve 64 corresponding to the front wheels FL and FR is not closed, the supply amount Qf of the brake fluid into the wheel cylinder 21 corresponding to the front wheels FL and FR increases.

In FIG. 3(*g*), the transition of the supply amount Qf when the holding valve 64 corresponding to the rear wheels RL and RR is not closed is shown with a broken line. Furthermore, in FIG. 3(*d*), the transition of the braking force BP with respect to the front wheels FL and FR when the holding valve 64 corresponding to the rear wheels RL and RR is not closed is shown with a broken line. Moreover, in FIG. 3(*c*), the transition of the vehicle-body deceleration DVS when the holding valve 64 corresponding to the rear wheels RL and RR is not closed is shown with a broken line. In FIG. 3(*d*), the transition of the vehicle body speed VS of the vehicle when the holding valve 64 corresponding to the rear wheels RL and RR is not closed is shown with a broken line.

As shown in FIG. 3(*g*), the supply amount Qf is increased by closing the holding valve 64 corresponding to the rear wheels RL and RR. As a result, the increasing speed of the braking force BP with respect to the front wheels FL and FR can be increased, as shown in FIG. 3(*d*). Therefore, as shown in FIG. 3(*c*), since the increasing speed of the vehicle-body deceleration DVS is increased, the vehicle-body deceleration DVS can reach the vehicle-body deceleration target value DVSTh early. Thus, as shown in FIG. 3(*b*), the vehicle can be stopped earlier than in a case where the holding valve 64 corresponding to the rear wheels RL and RR is not closed.

Incidentally, the performance of the front wheel braking mechanisms 20*a* and 20*b* is generally higher than the performance of the rear wheel braking mechanisms 20*c* and 20*d*. That is, when the WC pressure Pwc in the wheel cylinders 21 of the front wheel braking mechanisms 20*a* and 20*b* and the WC pressure Pwc in the wheel cylinders 21 of the rear wheel braking mechanisms 20*c* and 20*d* are equal to each other, the braking force BP with respect to the front wheels FL and FR becomes higher than the braking force BP with respect to the rear wheels RL and RR. Thus, the concentrated supply of the brake fluid to the wheel cylinder 21 of the front wheel braking mechanisms 20a and 20b having high performance as in the present embodiment contributes to the rapid increase of the vehicle-body deceleration DVS of the vehicle.

During the execution of the first main braking process, when the nut 32 is pushing the piston 24 in the wheel cylinders 21 of the rear wheel braking mechanisms 20c and 20d by the driving of the motor 31 for parking, the volume in the wheel cylinder 21 expands. If the brake fluid is not supplied into the wheel cylinder 21 under such a situation, the WC pressure Pwc may become lower than the atmospheric pressure. In this case, the atmospheric air may flow into the wheel cylinder 21 from the outside through the gaps of the configuring parts of the wheel cylinder 21.

Therefore, in the present embodiment, as shown in FIGS. 3(j) and 3(k), the pressure reducing valve 65 corresponding to the rear wheels RL and RR is opened during the period from the third timing t13 to the fourth timing t14 while the motor 31 for parking is being driven during the execution of the first main braking process. Thus, a part of the brake fluid that has flowed from the master cylinder 51 into the reservoir 66 by the operation of the pump 68 flows into the wheel cylinder 21 corresponding to the rear wheels RL and RR through the pressure reducing valve 65. As a result, the WC pressure Pwc in the wheel cylinder 21 can be suppressed from becoming lower than the atmospheric pressure even when the volume in the wheel cylinder 21 is increased by the driving of the motor 31 for parking. Therefore, the atmospheric air can be suppressed from flowing into the wheel cylinder 21 from the outside, and furthermore, lowering in the braking performance of the rear wheel braking mechanisms 20c and 20d after the emergency automatic braking is ended can be suppressed.

The example shown in FIG. 3 is an example of a case where the automatic braking condition is satisfied after the nut 32 comes into contact with the bottom wall 241 of the piston 24 in the rear wheel braking mechanisms 20c and 20d due to the execution of the preliminary braking process. However, the automatic braking condition may be satisfied before the nut 32 comes into contact with the bottom wall 241, that is, before the second timing t12 in FIG. 3.

Even when the motor 31 for parking is driven, the braking force BP with respect to the rear wheels RL and RR cannot be increased in a period until the nut 32 comes into contact with the bottom wall 241. Thus, even in such a case, when the first main braking process is performed, a time lag occurs between the time point at which the execution of the first main braking process is started until the braking force BP with respect to the rear wheels RL and RR starts to increase. Therefore, in the present embodiment, when the automatic braking condition is satisfied before the nut 32 comes into contact with the bottom wall 241, the second main braking process is performed instead of the first main braking process. In the second main braking process, the driving speed of the pump motor 67 is increased, and the discharge amount Qttl of the brake fluid from the pump 68 is increased. That is, the discharge amount Qttl is about the same as the execution of the first main braking process. In addition, the opening degree of the differential pressure adjustment valve 62 is narrowed. Furthermore, unlike the first main braking process, the holding valve 64 corresponding to the rear wheels RL and RR is not closed, and the pressure reducing valve 65 corresponding to the rear wheels RL and RR is not opened.

Therefore, the WC pressure Pwc in each wheel cylinder 21 is increased by the operation of the pump 68 and the differential pressure adjustment valve 62. Then, not only the braking force BP corresponding to the front wheels FL and FR but also the braking force BP corresponding to the rear wheels RL and RR increases in conjunction with the increase of the WC pressure Pwc. As a result, the braking force BP corresponding to the rear wheels RL and RR can be increased with almost no influence of the time lag. Furthermore, the decrease in the increasing speed of the vehicle-body deceleration DVS of the vehicle can be suppressed by starting the increase of the braking force BP corresponding to the rear wheels RL and RR at an early stage.

The embodiment described above may be modified to another embodiment as described below.

The first main braking process may be performed even if the automatic braking condition is satisfied before the nut 32 comes into contact with the bottom wall 241 of the piston 24. In this case, in the preliminary braking process, the holding valve 64 corresponding to the rear wheels RL and RR may be closed, and the brake fluid may not be supplied to the wheel cylinder 21 corresponding to the rear wheels RL and RR.

In the embodiment described above, the opening of the pressure reducing valve 65 corresponding to the rear wheels RL and RR may be continued even after the driving of the motor 31 for parking is stopped during the execution of the first main braking process. For example, the pressure reducing valve 65 may be closed in response to an elapse of a prescribed time from the time point at which the driving of the motor 31 for parking is stopped. Alternatively, the pressure reducing valve 65 may be closed after the vehicle is in the stop state.

If it is secured that the atmospheric air does not flow into the wheel cylinder 21 from the outside even if the volume in the wheel cylinder 21 corresponding to the rear wheels RL and RR is expanded by the driving of the motor 31 for parking during execution of the first main braking process, the pressure reducing valve 65 corresponding to the rear wheels RL and RR may not be opened in the first main braking process.

The control device 100 may be applied to a vehicle in which the electric parking device 30 is provided on the front wheels FL and FR instead of the rear wheels RL and RR. In this case, in the first main braking process, the holding valve 64 corresponding to the rear wheels RL and RR is not closed, and the holding valve 64 corresponding to the front wheels FL and FR is closed.

In the first main braking process, if the supply of the brake fluid to the wheel cylinder 21 corresponding to one of the wheels provided with the electric parking device 30 can be restricted, the holding valve 64 corresponding to one of the wheels may not be closed. For example, the supply of the brake fluid to the wheel cylinder 21 corresponding to one of the wheels can be restricted by making the opening degree of the holding valve 64 corresponding to one of the wheels smaller than that before the execution of the first main braking process. Furthermore, when the holding valve 64 corresponding to one of the wheels is not closed, the brake fluid flows into the wheel cylinder 21 through the holding valve 64 when the volume in the wheel cylinder 21 is increased by the driving of the motor 31 for parking. Therefore, the pressure reducing valve 65 corresponding to one of the wheels does not need to be opened when the motor 31 for parking is being driven.

In the embodiment described above, the motor 31 for parking is driven until the nut 32 comes into contact with the bottom wall 241 of the piston 24 during the execution of the preliminary braking control. However, the prescribed interval may be a value larger than "0", as long as the interval between the nut 32 and the bottom wall 241 can be narrowed during the execution of the preliminary braking process. In this case, a sensor capable of detecting the position of the nut 32 or the interval between the nut 32 and the bottom wall 241 is preferably provided in the electric parking device 30.

In the embodiment described above, although the differential pressure adjustment valve 62 is not operated during the execution of the preliminary braking process, the differential pressure adjustment valve 62 may be operated during the execution of the preliminary braking process.

If the hydraulic pressure braking device includes a fluid supply source that operates to supply the brake fluid to each wheel cylinder 21, the hydraulic pressure braking device may have a configuration other than the hydraulic pressure braking device 40 described in the above embodiment. For example, as a hydraulic pressure braking device, a device including an electric cylinder that sends the brake fluid corresponding to the driving amount of the cylinder motor to each wheel cylinder 21 can be mentioned. In this case, the electric cylinder functions as an example of the "fluid supply source". In this hydraulic pressure braking device, when the brake fluid is being discharged by the operation of the electric cylinder, a larger amount of brake fluid can be supplied to the wheel cylinder 21 corresponding to the front wheels FL and FR by narrowing the opening degree of the holding valve 64 corresponding to the rear wheels RL and RR. Therefore, in the first main braking process, the increasing speed of the vehicle-body deceleration DVS at the start of the execution of the process can be increased by applying a braking force to the rear wheels RL and RR by the electric parking device 30 while operating the hydraulic pressure braking device in such a manner.

Furthermore, as a hydraulic pressure braking device having other configurations other than the hydraulic pressure braking device 40 described in the above embodiment, a hydraulic pressure braking device including a hydraulic type hydraulic pressure generation device can be mentioned. In this case, a larger amount of brake fluid can be supplied to the wheel cylinder 21 corresponding to the front wheels FL and FR by narrowing the opening degree of the holding valve 64 corresponding to the rear wheels RL and RR while increasing the hydraulic pressure of the master chamber of the master cylinder of the hydraulic pressure generation device. Therefore, in the first main braking process, the increasing speed of the vehicle-body deceleration DVS at the start of the execution of the process can be increased by applying a braking force to the rear wheels RL and RR by the electric parking device 30 while operating the hydraulic pressure braking device in such a manner.

An indicator acquired by the acquisition unit 110 may be any value other than the collision margin time TTC, as long as it is a value indicating the degree of the possibility of the vehicle colliding with an obstacle located ahead of the vehicle. For example, as such an indicator, an approaching/separating state evaluation indicator, an inter-vehicle time, and the like can be mentioned. The approaching/separating state evaluation indicator is an indicator calculated based on the assumption that the driver of the vehicle is performing the acceleration/deceleration operation while detecting the approach/separation by the change in visual area of the obstacle. The inter-vehicle time is the time required for the vehicle to reach the position of the obstacle at the current time under the assumption that the vehicle body speed VS of the vehicle at the current time is maintained.

The invention claimed is:

1. A vehicle braking control device to be applied to a vehicle,
   the vehicle including:
      a plurality of braking mechanisms provided for each of the front and rear wheels of a vehicle;
      a hydraulic pressure braking device including a fluid supply source that supplies a brake fluid to a wheel cylinder of each of the braking mechanisms, and configured to individually adjust a hydraulic pressure in each wheel cylinder; and
      an electric braking device that applies a braking force corresponding to a driving amount of an electric motor to one of a front wheel and a rear wheel,
   the vehicle braking control device comprising:
      an acquisition unit that acquires an indicator representing a degree of a possibility that the vehicle collides with an obstacle ahead of the vehicle; and
      a braking control unit that starts execution of an automatic braking process of increasing a braking force on both the front wheel and the rear wheel and decelerating the vehicle when determined that an automatic braking condition is satisfied based on the acquired indicator,
   wherein, in the automatic braking process, the braking control unit restricts supply of a brake fluid to the wheel cylinder corresponding to one wheel and supplies a brake fluid to the wheel cylinder corresponding to the other of the front wheel and the rear wheel to increase a hydraulic pressure in the wheel cylinder to cause the hydraulic pressure braking device to increase a braking force on the other wheel and cause the electric braking device to increase a braking force on the one wheel by driving of the electric motor,
   wherein the hydraulic pressure braking device has a holding valve that is closed when regulating a flow of a brake fluid from the fluid supply source into the wheel cylinder, and a pressure reducing valve that is opened when permitting a flow of the brake fluid from the wheel cylinder out to a reservoir, provided for every wheel cylinder,
   wherein the fluid supply source is a pump that pumps the brake fluid in a master cylinder through the reservoir and discharges the brake fluid, and
   wherein, in the automatic braking process, the braking control unit
      increases the hydraulic pressure in the wheel cylinder corresponding to the other wheel by not closing the holding valve corresponding to the other wheel and closing the pressure reducing valve corresponding to the other wheel, and
      restricts increase in the hydraulic pressure in the wheel cylinder corresponding to the one wheel by closing the holding valve corresponding to the one wheel and opening the pressure reducing valve corresponding to the one wheel.

2. The vehicle braking control device according to claim 1, wherein
   each of the braking mechanisms includes a rotary body that rotates integrally with the wheel, and a friction material that relatively moves in a direction of approaching to and separating from the rotary body, the electric braking device includes a pushing member disposed in the wheel cylinder, and configured to move forward or backward in a direction of approaching to and separating from the rotary body by driving the electric motor, the hydraulic pressure braking device pushes the friction material against the rotary body by displacing a piston of the wheel cylinder by increasing the hydraulic pressure in the wheel cylinder when applying a braking force to the wheel, the electric braking device pushes the friction material against the rotary body by displacing the pushing member by the driving of the electric motor and displacing the piston by the pushing member when applying a braking force to the one wheel, and assuming a condition with which determination is made that there is a possibility of collision although such possibility of the vehicle colliding with the obstacle is lower than when the automatic braking condition is satisfied is referred to as a preliminary braking condition, and the automatic braking process is referred to as a main braking process, when determined that the preliminary braking condition is satisfied although the automatic braking condition is not satisfied based on the indicator acquired by the acquisition unit, the braking control unit supplies the brake fluid from the fluid supply source into each wheel cylinder to control the hydraulic pressure braking device so that the friction material approaches the rotary body in each braking mechanism, and starts the execution of the preliminary braking process for controlling the electric braking device so as to drive the electric motor until an interval between the pushing member and the piston becomes smaller than or equal to a prescribed interval in the wheel cylinder corresponding to the one wheel.

3. The vehicle braking control device according to claim 2, wherein when the main braking process is a first main braking process, the braking control unit starts the execution of the first main braking process when determined that the automatic braking condition is satisfied based on the indicator acquired by the acquisition unit under a situation where the interval between the pushing member and the piston is smaller than or equal to the prescribed interval in the wheel cylinder corresponding to the one wheel by the execution of the preliminary braking process, and supplies the brake fluid from the fluid supply source to each wheel cylinder and increases the hydraulic pressure in each wheel cylinder to start the execution of a second main braking process of increasing a braking force for each wheel when determined that the automatic braking condition is satisfied based on the indicator acquired by the acquisition unit under a situation where the interval between the pushing member and the piston is larger than the prescribed interval in the wheel cylinder corresponding to the one wheel.

* * * * *